United States Patent
Kang et al.

(10) Patent No.: US 6,414,957 B1
(45) Date of Patent: Jul. 2, 2002

(54) PARALLEL PROCESSOR FOR USE IN DISTRIBUTED SAMPLE SCRAMBLER

(75) Inventors: Sun Kang; Jong Uk Chae, both of Taejon; Kyeong Hwan Doo, Jungeup, all of (KR)

(73) Assignee: Electronics and Telecommunications Research Institute, Daejon (KR)

( * ) Notice: Subject to any disclaimer, the term of this patent is extended or adjusted under 35 U.S.C. 154(b) by 0 days.

(21) Appl. No.: 09/201,903

(22) Filed: Nov. 30, 1998

(30) Foreign Application Priority Data

Nov. 28, 1997 (KR) .............................. 97-64086

(51) Int. Cl.[7] .............................................. H04L 9/18
(52) U.S. Cl. ..................... 370/395.1; 380/42; 380/47
(58) Field of Search .......................... 370/395.1, 395.6, 370/905; 714/52, 151, 152, 160; 380/43, 44, 46, 47, 268, 276

(56) References Cited

U.S. PATENT DOCUMENTS

| | | | | |
|---|---|---|---|---|
| 5,301,192 A | * | 4/1994 | Henrion | 370/94.1 |
| 5,355,415 A | * | 10/1994 | Lee et al. | 380/47 |
| 5,448,640 A | * | 9/1995 | Kim et al. | 380/48 |
| 5,881,154 A | * | 3/1999 | Nohara et al. | 380/42 |
| 6,058,119 A | * | 5/2000 | Engbersen et al. | 370/466 |
| 6,188,692 B1 | * | 2/2001 | Huscroft et al. | 370/395 |

* cited by examiner

Primary Examiner—Melvin Marcelo
Assistant Examiner—Duc Duong
(74) Attorney, Agent, or Firm—Antonelli, Terry, Stout & Kraus, LLP

(57) ABSTRACT

A parallel processor of a distributed sample scrambler of cell-based physical layer of ISDN(Integrated Service Digital Network) used in a 16-bit mode of utopia interface is disclosed. The parallel processor employs a simple logic to process a predetermined bit of pseudo random binary bit stream in parallel, discriminating the cell boundary of the IDSN easily and reliably. The parallel processor comprises a first pseudo random bit stream production block for producing a first pseudo random binary bit stream within a word parallel clock according to a predetermined byte of an ATM(Asynchronous Transfer Mode) cell applied from an external; a second pseudo random bit stream production block for producing a second pseudo random binary bit stream within a word parallel clock according to the predetermined byte of the ATM cell; and a selector for selectively producing one of the first and the second pseudo random binary bit streams according to an external signal.

4 Claims, 3 Drawing Sheets

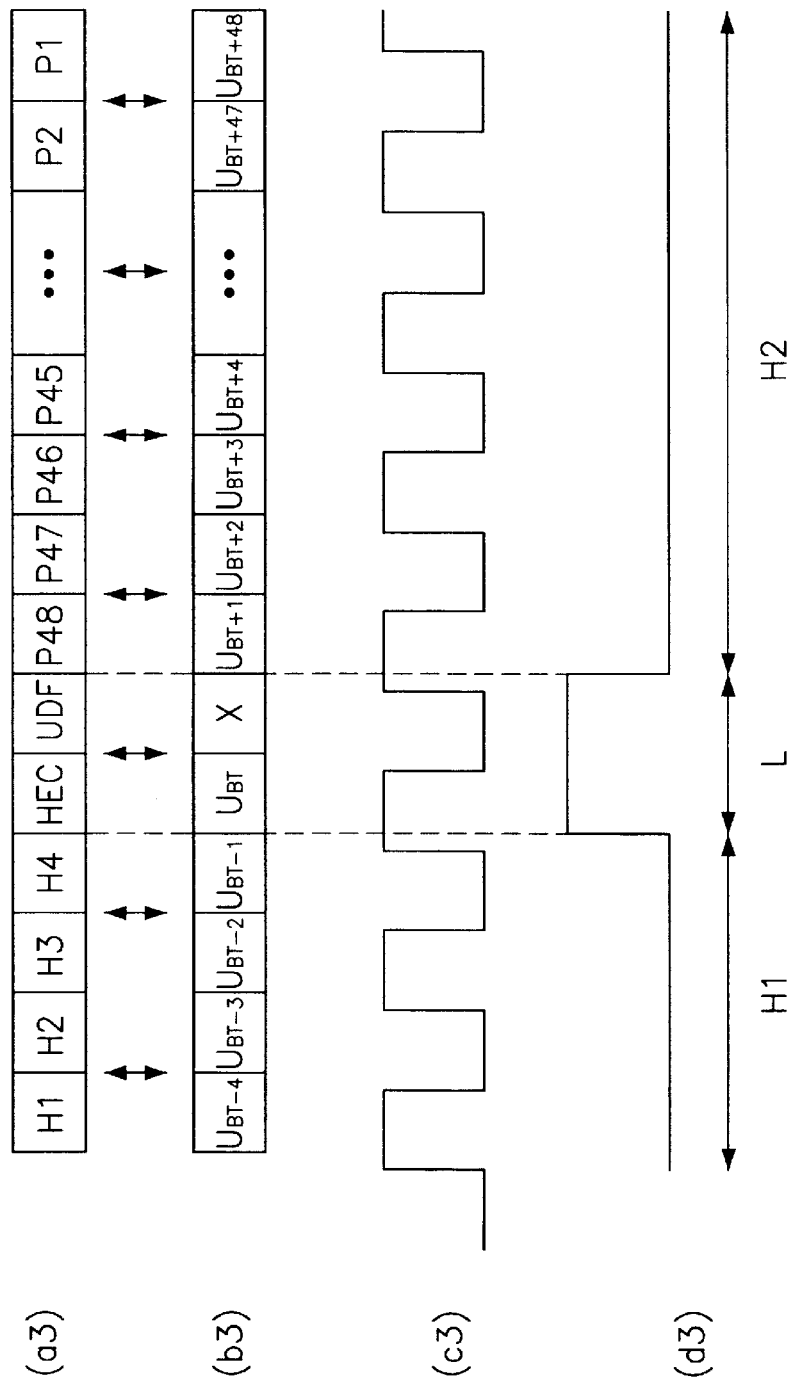

PARALLEL PROCESSOR FOR USE IN DISTRIBUTED SAMPLE SCRAMBLER

BACKGROUND OF THE INVENTION

1. Technical Field

This invention relates to a technique allowing a distributed sample scrambler used in a cell-based physical layer of ISDN(Integrated Service Digital Network) to be employed in a 16-bit mode utopia interface, more particularly, to a parallel processor of a distributed sample scrambler, without an extra logic, capable of parallel-processing a pseudo random binary bit stream based on a predetermined bit unit according to a mode selection signal.

2. Description of the Related Arts

In a prior art, a parallel processor of distributed sample scrambler can process an 8-bit mode cell of the utopia interface located between an ATM(asynchronous transmission mode layer) and a physical layer of the ISDN, however, it can't process 16-bit mode cell which have a different format of the 8-bit mode cell.

Table 1 shows a 16-bit mode cell format of the utopia interface.

TABLE 1

| 16-bit mode | |
|---|---|
| bit15 | bit0 |
| HEADER1 | HEADER2 |
| Header3 | Header4 |
| HEC | UDF |
| Payload1 | Payload2 |
| . | . |
| . | . |
| . | . |
| Payload47 | Payload48 |
| | time |

One byte is added to a UDF (User-Defined field) nearly located in a head error control (HEC) signal and, therefore, totally 54 byte cells are transmitted between the ATM layer and the physical layer.

In the prior art, therefore, in case that the distributed sample scramble is processed in the 16 bits, one byte PRBs is generated on UDF passing time, so one byte PRBs should be shifted to be added proper position in the ATM cell. But this shift method cannot solve the problem because one byte is left at each ATM cell.

SUMMARY OF THE INVENTION

It is, therefore, an primary object of the present invention to provide a parallel processor of a distributed sample scrambler, which utilizes a simple logic to parallel-process a predetermined bit of the pseudo random binary bit stream, so that easily and reliably discriminate the cell boundary of the IDSN.

According to the present invention, a parallel processor of a distributed sample scrambler, comprises: first pseudo random bit stream production means for producing a first pseudo random binary bit stream within a word parallel clock according to a predetermined byte of-an ATM (Asynchronous Transfer Mode) cell applied from an external; second pseudo random bit stream production means for producing a second pseudo random binary bit stream within a word parallel clock according to the predetermined byte of the ATM cell; a selection means for selectively producing one of the first and the second pseudo random binary bit streams according to an external signal; storing means for temporally storing an output signal from the selection means to produce the temporally stored output signal to both the first pseudo random binary bit stream production means and the second pseudo random binary bit stream production means; exclusive-OR means for processing an exclusive-OR operation with two inputs, wherein, one input is an output signal from the storing means and the other input is the predetermined byte of the ATM cell; head error control signal production means for receiving an output signal from the exclusive-OR means to produce a head error control signal; sampling. means for sampling a sample value from an output signal from the storing means; and means for processing an exclusive-OR operation with two inputs to produce the ATM cell, wherein, one of the two inputs is a sample value from the sampling means and the other is the head error control signal.

These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

For a more complete understanding of the present invention and the advantage thereof, reference is now made to the following description taken in conjunction with the accompanying drawings in which:

FIG. 5 is a timing chart of the parallel processor of FIG. 4.

DETAILED DESCRIPTION OF THE INVENTION

Figure 1:
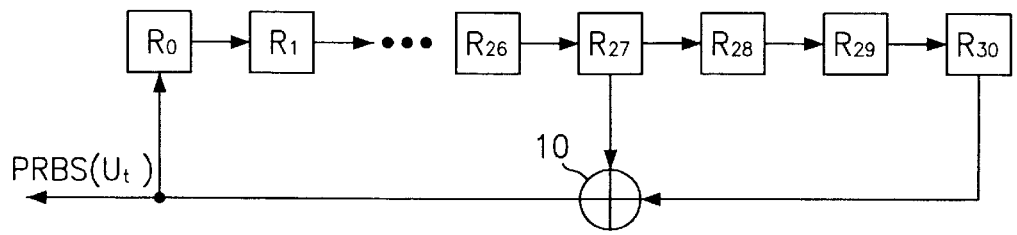
FIG. 1 is a common circuit of generating a serial pseudo random binary bit stream.

FIG. 1 shows a common circuit of generating a serial pseudo random binary bit stream. As shown in FIG. 1, the circuit has 31 number of registers (R0–R30) which is serially coupled therebetween, and a first exclusive-OR gate 10 for processing an exclusive-OR operation with two inputs: the output signal of 28th register(R27) and output signal of a last register(R30).

The operation of the circuit of FIG. 1 is as follows.

The 28th register(R27) outputs a shift regist signal which is made through the cascaded 28-number of registers (R0–R27), to the first exclusive-OR gate 10. And the last register(R30) outputs another shift regist signal which is made through the serial coupled 31-number of registers (R–R31), to the first exclusive-OR gate 10. And then, the first exclusive-OR gate process exclusive-OR operation with two inputs: the output signals from the registers R27 and R28, to produce a pseudo random binary bit stream PRBS (Ut) to an output terminal, and also the PRBS (Ut) is applied to the first register(R0).

At this time, the serial pseudo random binary bit stream generating circuit performs a pseudo random binary bit stream generating a polynominal term, that is, $x^{31}+x^{28}+1$. The following Table 2A shows a phase of the pseudo random binary bit stream in the distributed sample scrambling.

TABLE 2A

| Ut−1 | Ut | Ut+1 | Ut+2 | Ut+3 | Ut+4 | Ut+5 | Ut+6 | Ut+7 | Ut+8 | Ut+9 |
|------|----|------|------|------|------|------|------|------|------|------|

The following Table 2B represents the structure of the ATM cell.

TABLE 2B

| CLP + Ut−1 | HEC8 + Ut−211 | HEC7 + Ut+1 | HEC7 | HEC6 | HEC5 | HEC4 | HEC3 | HEC2 | HEC1 | $1^{st}$ pay_bit + Ut+8 | $2^{nd}$ pay_bit + Ut+9 |
|---|---|---|---|---|---|---|---|---|---|---|---|

Figure 2:
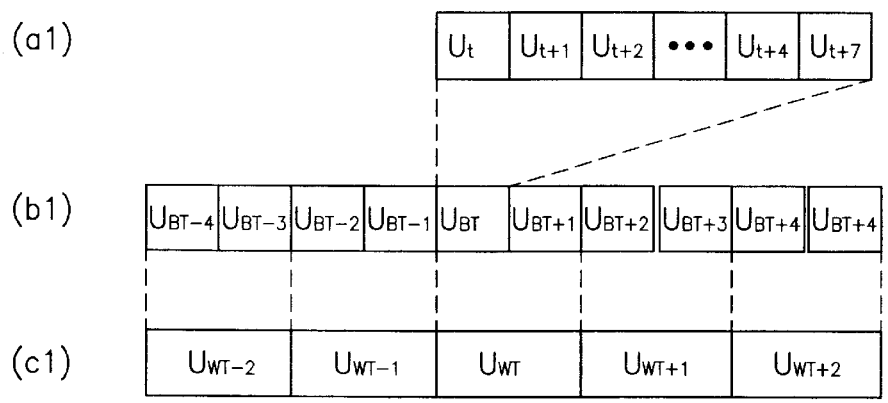
FIG. 2 shows a diagram of mapping a serial pseudo random binary bit stream to a parallel pseudo random binary stream.

FIG. 2 shows a diagram of mapping a serial pseudo random binary bit stream to a parallel pseudo random binary stream; As shown in FIG. 2, (a1) is a bit serial pseudo random binary bit stream, (b1) is a byte parallel pseudo random binary bit stream, (c1) is a word parallel pseudo random binary stream.

Both of the byte parallel pseudo random binary bit stream and the word parallel pseudo random binary bit stream are produced from the serial pseudo random binary bit stream generating circuit of FIG. 1. And the byte parallel pseudo random binary bit stream PRBS(UBT) and the word pseudo random binary bit stream PABS(UWT) are calculated by a relation between a present register value and an 8-bit behind register value or a 16-bit behind register value, respectively.

Figure 3:
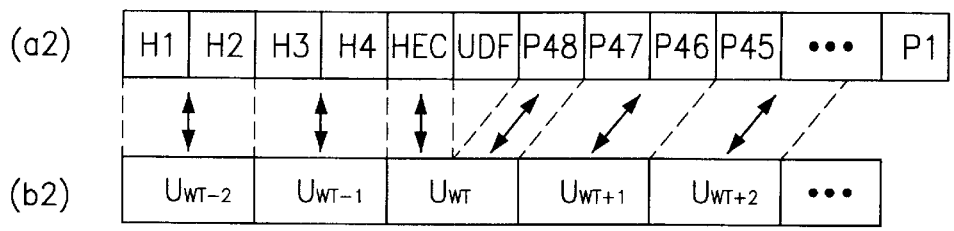
FIG. 3 describes a timing chart showing a relation between the timing of producing a word parallel pseudo random binary bit stream in case of 16 bits parallel process and that of ATM cell of 54 bytes.

FIG. 3 describes a timing chart showing a relation between a timing of generating a word parallel pseudo random binary bit stream in case of 16 bits parallel process and that of ATM cell of 54 bytes;

As shown in FIG. 3, (a2) is a timing of the 54 byte ATM cell, and (b2) is a timing of the word parallel pseudo random binary bit stream.

There occurs a half clock difference between the word parallel pseudo random binary bit stream and the 54-byte ATM cell. To avoid the half clock difference, the 8-bit of the word parallel pseudo random binary bit stream must be shifted behind the head error control signal. In this way, 16 bits must be shifted at next cell, and then 24 bits must be shifted at the one after next cell. Since, however, in case that each cell is inputted, the bit number increases by 8 bits so that an infinite capacity of buffer is required, it is impossible to implement the above way.

Also, another method to avoid the half clock difference is as follows. Since the generating timing of the word pseudo random binary bit stream is faster by a word by two cells than that of 54 bytes ATM cell, it enables the word pseudo random binary bit stream not to occur at the last word of the even number cell. And then, after an odd number head error control signal, it enables each pseudo random binary bit stream to shift by 8 bits every word, and then, after the even number head error control signal, it enables each pseudo random binary bit stream to shift by 16 bits.

The above method has a number of shortcomings: (1)classification of even and odd cells, (2)always shift of a generated pseudo random binary bit stream with exception of an odd cell of the first ATM cell header, and a risk of addition of wholly different pseudo random binary bit stream resulting from error cell.

However, all the processes of the present invention are performed by clock-by-clock, so that a wrong pseudo random binary bit stream does not occur. And also, the parallel processor of the distributed sample scrambler for the 16-bit mode utopia interface is implemented by supplying a simple logic(selection signal of a selector and another selector) to the word parallel processing basic logic.

Figure 4:
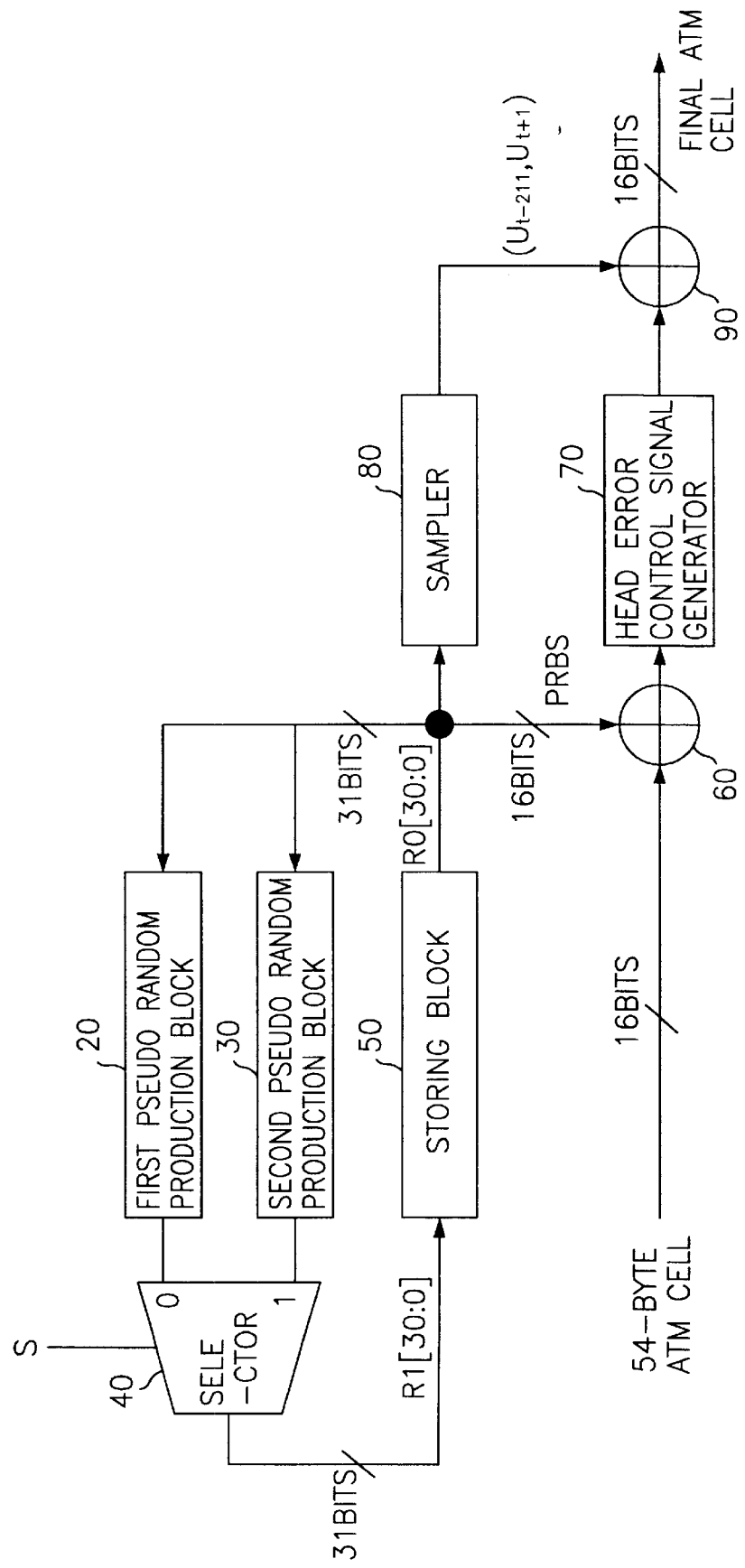
FIG. 4 is a block diagram of parallel processor of a distributed sample scrambler in accordance with the present invention.

FIG. 4 is a block diagram of a parallel processor of a distributed sample scrambler in accordance with the present invention.

As shown in FIG. 4, the parallel processor comprises a first pseudo random bit production block 20 producing 16-bit pseudo random binary bit stream in a word parallel clock according to the 54-byte ATM cell applied from an external; a second pseudo random bit production block 30 which producing 8-bit pseudo random binary bit stream in a byte parallel clock according to 54 byte ATM cell applied from an external; a selector 40 selectively producing one of the 16-bit pseudo random binary bit stream and the 8-bit pseudo random binary bit stream according to another external signal; a storing block 50 for temporally storing the output signal from the selector 40 to produce the temporally stored signal to the first and the second pseudo random bit stream production blocks 20 and 30; a second exclusive-OR gate 60 for processing an exclusive-OR operation with two inputs, wherein one is the output signal from the storing block 50 and the other is the 54 byte ATM cell; a head error control signal generator 70 for receiving the output signal from the second exclusive-OR gate 60 to produce a head error control signal; a sampler for sampling the output signals from the storing block 50; and a third exclusive-OR gate 90 for processing exclusive-OR operation with two inputs; the output signal from the sampler 80 and the head error control signal from the head error control signal generator 70.

The storing block 50 includes 31-number of registers performing shift-regist operation.

The operation of the parallel processor of the distributed sample scrambler of FIG. 4 is as follows.

The first pseudo random bit stream production block 20 does not operated in the initial state. However, when it becomes operation mode, a 16-bit pseudo random binary bit stream in a word parallel clock according to 54 byte ATM cell applied from an external is outputted to the selector 40. And also, when the second pseudo random bit stream production block 30 turns to a operation mode, an 8-bit pseudo random binary bit stream in a word parallel clock according to 54 byte ATM cell applied from an external is outputted to the selector 40.

The selector 40 selects one of the 16-bit pseudo random binary bit stream from the first pseudo random bit stream production block 20 and the 8-bit pseudo random binary bit stream the second pseudo random bit stream production block 30 according to an external signal, and then it produces the selected one to the storing block 50. Thereafter, the storing block 50 for temporally storing the output signal from the selector 40 to produce the temporally stored signal to the first pseudo random bit stream production block 20, the second pseudo random bit stream production blocks 30, the second exclusive-OR gate 60 and the sampler 80.

The second exclusive-OR gate 60 processes an exclusive-OR operation with two inputs which are the output signal from the storing block 50 and 54 byte ATM cell applied to an external, and sends the result of the exclusive-OR operation to head error control signal generator 70, The head error control signal generator 70 receives the output signal from the second 5 exclusive-OR gate 60 to produce the head error control signal to the third exclusive-OR gate 90. And the sampler samples a 211-prior-bit of the pseudo random binary bit stream Ut-211 that is to be exclusive-OR operation with the head error control signal HEC8 that is the first Bit of the head error control signal, and then produces it to the third exclusive-OR gate 90. And also, the sampler 80 samples a pseudo random binary bit stream Ut+1 that is to be exclusive-OR with the second bit of the head error control signal HEC7, and then it produces the sampled data to the third exclusive-OR gate 90.

Thereafter, the third exclusive-OR gate 90 processes exclusive-OR operation with two inputs; the sample value Ut–21and the head error control signal HEC8, and then processes another exclusive-OR operation with two inputs, that is the head error control signal and the pseudo random binary bit Ut+1, to produce the ATM cell to an external.

Table 3 shows a parallel processing logic value of the parallel processor of the distributed sample scrambler in accordance with the present invention.

TABLE 3

| Parallel process Logic value | 8-bit parallel PRBS ($U_{BT}$) | 16-bit parallel PRBS ($U_{WT}$) | 8-bit parallel process | 16-bit parallel process |
|---|---|---|---|---|
| $RI_0$ | $U_1$ | $U_1$ | $RO_{23} + RO_{20}$ | $RO_{15} + RO_{12}$ |
| $RI_1$ | $U_2$ | $U_2$ | $RO_{24} + RO_{21}$ | $RO_{16} + RO_{13}$ |
| $RI_2$ | $U_3$ | $U_3$ | $RO_{25} + RO_{22}$ | $RO_{17} + RO_{14}$ |
| $RI_3$ | $U_4$ | $U_4$ | $RO_{26} + RO_{23}$ | $RO_{18} + RO_{15}$ |
| $RI_4$ | $U_5$ | $U_5$ | $RO_{27} + RO_{24}$ | $RO_{19} + RO_{16}$ |
| $RI_5$ | $U_6$ | $U_6$ | $RO_{28} + RO_{25}$ | $RO_{20} + RO_{17}$ |
| $RI_6$ | $U_7$ | $U_7$ | $RO_{29} + RO_{26}$ | $RO_{21} + RO_{18}$ |
| $RI_7$ | $U_8$ | $U_8$ | $RO_{30} + RO_{27}$ | $RO_{22} + RO_{19}$ |
| $RI_8$ | | $U_{10}$ | $RO_0$ | $RO_{23} + RO_{20}$ |
| $RI_9$ | | $U_{11}$ | $RO_1$ | $RO_{24} + RO_{21}$ |
| $RI_{10}$ | | $U_{12}$ | $RO_2$ | $RO_{25} + RO_{22}$ |
| $RI_{11}$ | | $U_{13}$ | $RO_3$ | $RO_{26} + RO_{23}$ |
| $RI_{12}$ | | $U_{14}$ | $RO_4$ | $RO_{27} + RO_{24}$ |
| $RI_{13}$ | | $U_{15}$ | $RO_5$ | $RO_{28} + RO_{25}$ |
| $RI_{14}$ | | $U_{16}$ | $RO_6$ | $RO_{29} + RO_{26}$ |
| $RI_{15}$ | | | $RO_7$ | $RO_{30} + RO_{27}$ |
| $RI_{16}$ | | | $RO_8$ | $RO_0$ |
| $RI_{17}$ | | | $RO_9$ | $RO_1$ |
| $RI_{18}$ | | | $RO_{10}$ | $RO_2$ |
| $RI_{19}$ | | | $RO_{11}$ | $RO_3$ |
| $RI_{20}$ | | | $RO_{12}$ | $RO_4$ |
| $RI_{21}$ | | | $RO_{13}$ | $RO_5$ |
| $RI_{22}$ | | | $RO_{14}$ | $RO_6$ |
| $RI_{23}$ | | | $RO_{15}$ | $RO_7$ |
| $RI_{24}$ | | | $RO_{16}$ | $RO_8$ |
| $RI_{25}$ | | | $RO_{17}$ | $RO_9$ |
| $RI_{26}$ | | | $RO_{18}$ | $RO_{10}$ |
| $RI_{27}$ | | | $RO_{19}$ | $RO_{11}$ |
| $RI_{28}$ | | | $RO_{20}$ | $RO_{12}$ |
| $RI_{29}$ | | | $RO_{21}$ | $RO_{13}$ |
| $RI_{30}$ | | | $RO_{22}$ | $RO_{14}$ |

As shown in Table 3, when we compare 16 bit parallel pseudo random binary bit stream to the 8 bit parallel pseudo random binary bit stream, the first random bit stream production block 20 producing the 16 bit parallel pseudo random binary bit stream includes all of the contents of the second pseudo random bit stream production block 30 producing the 8 bit parallel random binary bit stream, Therefore, if the first random bit stream production block 20 and the selector 40 are employed, it can be implemented that the parallel processor of the distributed sample scrambler for the 16 bit mode utopia interface. And also, by using the first pseudo random bit stream production block 20 and the selector 40, the parallel processor for the 8-bit mode of utopia interface. In this case, a selection signal(S) of the selector 40 is set to "H", It is no doubt that the parallel unit of the data and the pseudo random binary bit stream PRBS is a byte.

FIG. 5 shows a timing chart of the parallel processor of FIG. 4.

As shown in FIG. 5, (a3) is a timing of the 54 byte ATM cell applied from an external, (b3) is a timing of the pseudo random binary bit stream, (c3) is a timing of the word clock, and (d3) is a timing of a selection signal which is applied to the selector 40.

And, both intervals H1 and H2 are word parallel calculation intervals, and an interval L is a byte parallel calculation interval.

As explained above, in a parallel processor of a distributed sample scrambler in accordance with present invention, all the processes is performed by clock-by-clock base, so that a wrong pseudo random binary bit stream does not occur. And also, the parallel processor of the distributed sample scrambler for 16bit mode utopia interface is implemented by supplying a simple logic to the word parallel processing basic logic.

Various modification and alterations of this invention will become apparent to those skilled in the art without departing from the scope and spirit of this invention. It should therefore be understood that this invention is not unduly limited to the illustrative embodiments set forth above, but it to be controlled by the limitations set forth in the claims and equivalents thereof.

What is claimed is:

1. A parallel processor of a distributed sample scrambler, comprising:

first pseudo random bit stream production means for producing a first pseudo random binary bit stream within a word parallel clock according to a predetermined ATM (Asynchronous Transfer Mode) cell supplied from the external;

second pseudo random bit stream production means for producing a second pseudo random binary bit stream within a word parallel clock according to the predetermined ATM cell;

selection means for selectively producing one of the first and the second pseudo random binary bit streams according to an external signal;

storing means for temporally storing an output signal from the selection means to produce a temporally stored output signal to both the first pseudo random binary bit stream production means and the second pseudo random binary bit stream production means;

first exclusive-OR means for performing an exclusive-OR operation with two inputs, wherein one input is an output signal from the storing means and the other input is the predetermined ATM cell;

head error control signal production means for producing a head error control signal after receiving an output signal from the first exclusive-OR means;

sampling means for sampling an output signal from the storing means to produce a sample value; and second exclusive-OR means for performing an exclusive-OR operation with two inputs, wherein one input is the sample value from the sampling means and the other input is the head error control signal, to produce a final ATM cell.

2. The parallel processor of a distributed sample scramble as claimed in claim 1, wherein the first pseudo random binary bit stream is a 16-bit stream, and the second pseudo random binary bit stream is a 8-bit stream.

3. The parallel processor of a distributed sample scramble as claimed in claim 1, wherein the predetermined ATM cell is a 54-byte ATM cell.

4. The parallel processor of a distributed sample scramble as claimed in claim 1, wherein the storing means includes 31-number of registers for performing shift-register operation to produce the temporally stored output signal.

* * * * *